United States Patent [19]
Hatayama et al.

[11] Patent Number: 4,860,542
[45] Date of Patent: Aug. 29, 1989

[54] PISTON-CYLINDER PULSATOR CIRCUIT WITH SUPERPLASTIC ALLOY PRESSURE TRANSMITTING MEDIUM

[75] Inventors: Haruaki Hatayama; Hideo Takei; Takuji Okabe, all of Higashihiroshima; Yoshiharu Waku, Ube; Toyoaki Ueno, Yoshiki, all of Japan

[73] Assignee: UBE Industries, Ltd., Yamaguchi, Japan

[21] Appl. No.: 93,795

[22] Filed: Sep. 4, 1987

Related U.S. Application Data

[62] Division of Ser. No. 816,201, Jan. 6, 1986, Pat. No. 4,729,730.

[30] Foreign Application Priority Data

Jan. 9, 1985 [JP] Japan .................................. 60-1724

[51] Int. Cl.[4] ........................ B23P 17/04; B21F 21/00
[52] U.S. Cl. ........................................ 60/583; 60/533; 72/709
[58] Field of Search ......................... 60/533, 583, 594; 92/174; 72/709

[56] References Cited

U.S. PATENT DOCUMENTS

| | | | |
|---|---|---|---|
| 198,176 | 12/1877 | Alexander | 60/583 X |
| 3,315,470 | 4/1967 | Clews | 60/583 |
| 3,335,567 | 8/1967 | Atherholt, Sr. | 60/583 |
| 3,886,745 | 6/1975 | Kaida et al. | 60/533 |
| 4,142,888 | 3/1979 | Rozmus | 425/405 H |
| 4,302,168 | 11/1981 | Khvostantsev | 425/77 |
| 4,411,962 | 10/1983 | Johnson | 428/650 |
| 4,559,797 | 12/1985 | Raymond | 72/63 |
| 4,575,327 | 3/1986 | Borchert et al. | 419/49 |
| 4,599,215 | 7/1986 | Smarsely et al. | 425/78 |

FOREIGN PATENT DOCUMENTS

| | | | |
|---|---|---|---|
| 1220094 | 1/1960 | France | 60/583 |
| 113973 | 10/1978 | Japan | 60/583 |

OTHER PUBLICATIONS

Dalgleish, Jack and Dave Lee, "Prototype Parts from Superplastic Alloy Moulds", Telesis, Oct. 1978, vol. 5, No. 11, pp. 343-347.
Chaudhari, P., "Superplasticity", Science & Technology, Sep. 1968, pp. 42-49.

*Primary Examiner*—Robert E. Garrett
*Assistant Examiner*—George Kapsalas
*Attorney, Agent, or Firm*—Burgess, Ryan & Wayne

[57] ABSTRACT

In a method for transmitting force from one piston to another piston, a superplastic alloy is used between the pistons as a pressure transmitting medium. An apparatus adopting the method serves as a force multiplication apparatus.

7 Claims, 8 Drawing Sheets

PISTON-CYLINDER PULSATOR CIRCUIT WITH SUPERPLASTIC ALLOY PRESSURE TRANSMITTING MEDIUM

This is a division of application Ser. No. 816,201 filed Jan. 6, 1986 issued as U.S. Pat. No. 4,729,730 on Mar. 8, 1988.

BACKGROUND OF THE INVENTION

1. Field of the Invention

The present invention relates to a method and apparatus for transmitting a force utilizing a pressure transmitting medium.

2. Description of the Prior Art

A gas (e.g., air) or a liquid (e.g., oil, water) is conventionally used as a pressure transmitting medium in a pneumatic apparatus or a hydraulic apparatus. Such a pressure transmitting medium is also utilized by a hot isostatic pressing (IIP) apparatus, an extruder for metal, and the like used under high temperature operating conditions.

A liquid medium can generate a pressure higher than that generated by a gas medium, since a liquid has a compressibility much smaller than a gas. There are generally problems with oil, such as inclusion of gas (air), decrease of its compressibility under a very high pressure condition, and an upper limit (up to 200° C.) of its service temperature. Such an upper service temperature limit is determined since oil can burn when used at a high temperature. Furthermore, the liquid and gas are apt to leak due to fluctuations in temperature and pressure, particularly under a high pressure condition, so that the sealing structure must be complicated. Still further, if part of the feeding system of the liquid or gas under pressure breaks, the liquid or gas will spout out from the broken part.

SUMMARY OF THE INVENTION

An object of the present invention is to provide a new material for a pressure transmitting medium.

Another object of the present invention is to provide a method for transmitting a force under a high temperature condition and/or a high pressure condition.

Still another object of the present invention is to provide an apparatus for performing the above-mentioned method.

These and other objects of the present invention are attained by a method for transmitting a force by means of a pressure transmitting medium wherein a superplastic alloy is used as the medium.

The present invention is based on the fact that a superplastic alloy has a superior ability to transmit pressure. There are well-known pressure transmitting apparatuses utilizing liquids or gases, but no pressure transmitting apparatus utilizing metal as a medium has yet been developed. That is, the present inventors assume that persons skilled in the art have little idea that metal has an ability for transmitting pressure like a liquid.

BRIEF DESCRIPTION OF THE DRAWINGS

The present invention will become more apparent from the description of the preferred embodiments set forth below, with reference to the accompanying drawings, wherein.

DESCRIPTION OF THE PREFERRED EMBODIMENTS

Figure 1:
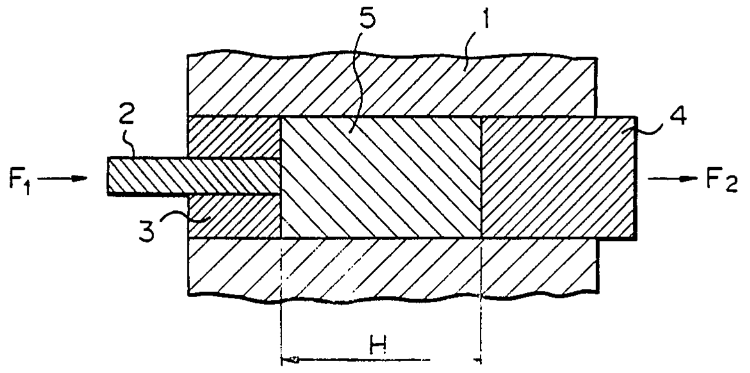
FIG. 1 is a schematic sectional view of an apparatus for transmitting pressure according to the present invention.
Figure 6A:
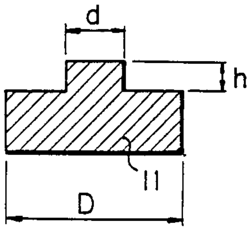
FIG. 6*a* is a sectional view of a superplastic alloy medium.
Figure 6B:
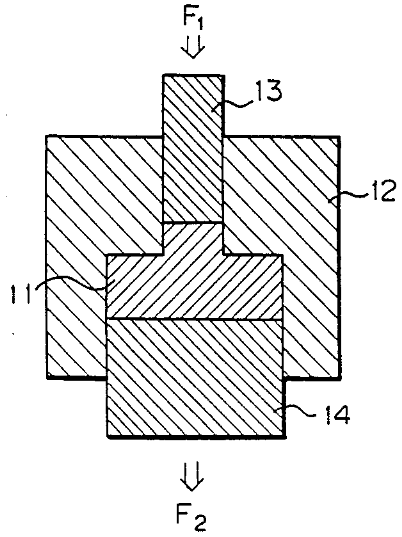
FIG. 6*b* is a schematic sectional view of another apparatus for transmitting pressure enclosing the medium shown in FIG. 6*a*, according to the present invention.

Referring to FIG. 1, an apparatus for transmitting pressure according to the present invention includes a cylinder 1, a piston 2 having a sectional area $A_1$, a stationary piston guide 3 for the piston 2, a piston 4 having a sectional area $A_2$, and a superplastic alloy medium 5. In this case, the sectional area $A_2$ larger than the sectional area $A_1$. The superplastic alloy medium 5 is, e.g., Sn-38Pb (eutectic) and is placed between the piston guide 3 and the piston 4 within the cylinder 1.

"Superplasticity" indicates a phenomenon of extremely large elongation of metal under a low stress at a low strain rate. Generally, when a superplastic alloy is deformed under specific conditions, the alloy displays a remarkable elongation of more than 200%, occasionally more than 1000%.

An Sn-38Pb superplastic alloy medium was produced in the following manner.

Sn and Pb were melted and cast into an ingot of Sn-38% Pb having a diameter of 55 mm and a length of 240 mm. The ingot was homogenized by annealing it at a temperature of 423° K. (150° C.) for 7 days. Then, the ingot was machined to form billets having a diameter of 50 mm and a length of 50 mm. The billets were extruded at a temperature of 373° K. (100° C.) into bars having diameters of 10 and 27 mm. Bars of 10 mm diameter were machined and then forged by using a die with a throughhole having a diameter of 16 mm at room temperature to form samples for a pressure transmitting medium. Bars of 27 mm were machined to form other samples having diameters of 25.4 mm.

Each of the obtained samples of the superplastic Sn-38Pb alloy was arranged in the above-mentioned pressure transmitting apparatus as shown in FIG. 1 and tested by applying a force $F_1$ on it (i.e., medium 5) through the piston 2 under various conditions. The testing temperature (423° K.) was not varied.

The parameters of the testing conditions were as follows:

| | |
|---|---|
| Sample (medium 5) Diameter: | 16, 25.4, 50 mm |
| Length (H): | 5, 10, 30, 50 mm |
| Area ($A_1$) of Piston 2: | 19.6, 50.2, 176.7 $mm^2$ |
| Area ($A_2$) of Piston 4: | 201, 506.7, 1964 $mm^2$ |
| Velocity (V) of Piston 2: | $8.33 \times 10^{-4}$ (m/s) |
| | $1.67 \times 10^{-4}$ |

-continued

| |
|---|
| $8.33 \times 10^{-5}$ |
| $8.33 \times 10^{-6}$ |
| $1.67 \times 10^{-6}$ |

The obtained data are shown in FIGS. 2 to 5. In FIGS. 2 to 5, "α" indicates a ratio of $A_2$ to $A_1$ ($A_2/A_1$). The relationship between the obtained force $F_2$ of the piston 4 and the force (i.e., load) $F_1$ of the piston 2 is indicated by the formula:

$$F_2 = Q(A_2/A_1)F_1 = Q \cdot \alpha \cdot F_1$$

wherein: Q is an efficiency factor of pressure transmission (i.e., an evaluation factor of pressure transmission ability) of the Sn-38Pb medium 5.

Figure 2:
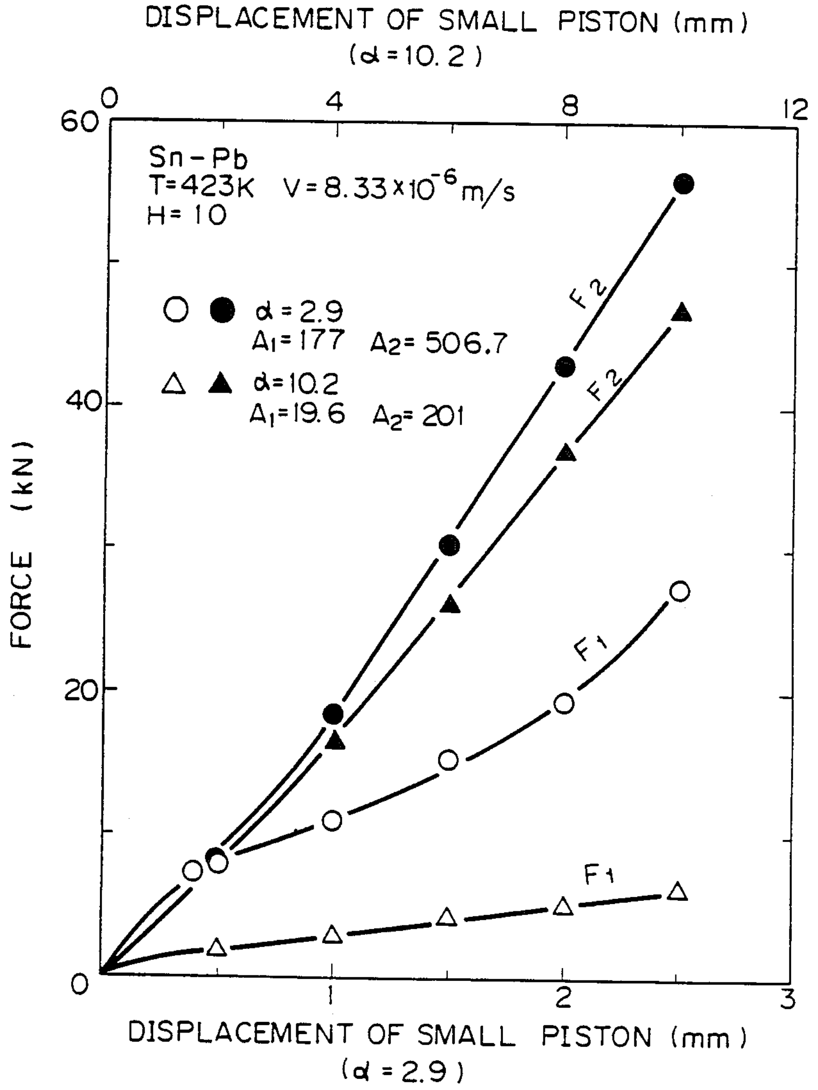
FIG. 2 is a graph showing a relationship between forces $F_1$ and $F_2$ and displacement of a small piston.

As shown in FIG. 2, as the displacement of the piston 2 increases, the forces $F_1$ and $F_2$ increase. The obtained force $F_2$ of the large piston 4 is larger than the force (load) $F_1$ of the small piston 2. Therefore, it is apparent that the Sn-38Pb (superplastic alloy) medium has an ability to transmit pressure.

If the medium is a liquid instead of a superplastic alloy, in accordance with Pascal's principle, the following formula is obtained:

$$F_2=(A_2/A_1)F_1$$

Figure 3:
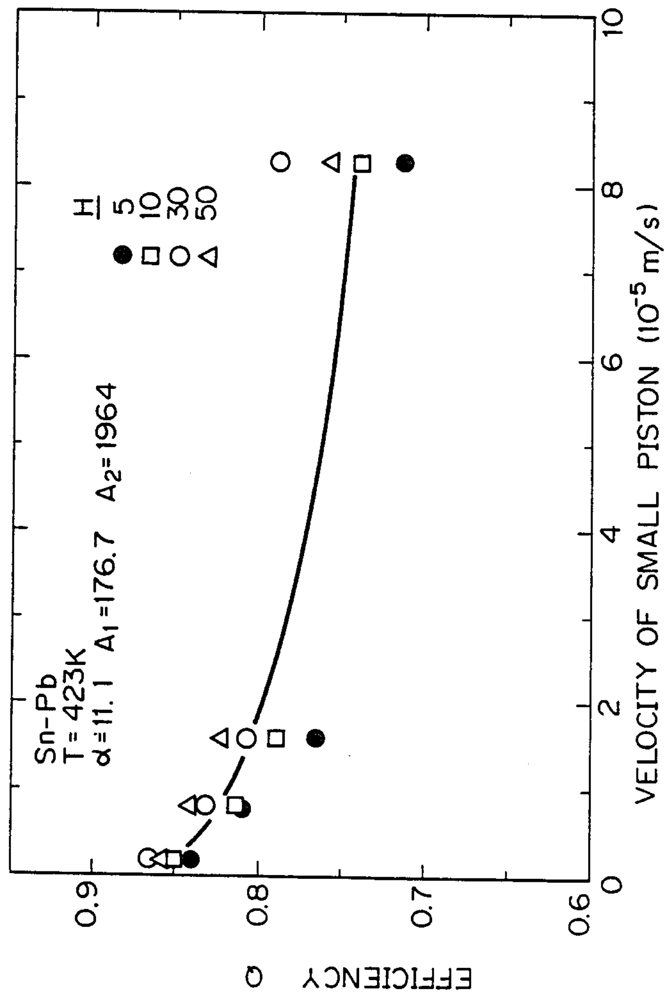
FIG. 3 is a graph showing a relationship between an efficiency "Q" of pressure transmission and a velocity of a small piston.
Figure 4:
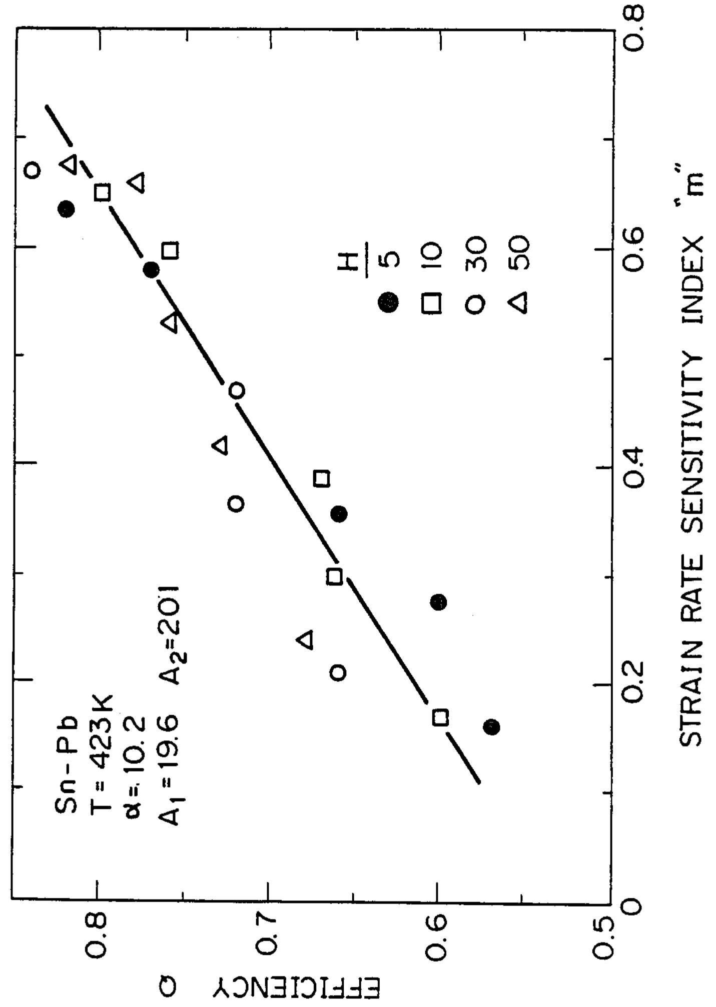
FIG. 4 is a graph showing a relationship between the efficiency "Q" and a train rate sensitivity index "m", at $\alpha = 10.2$.
Figure 5:
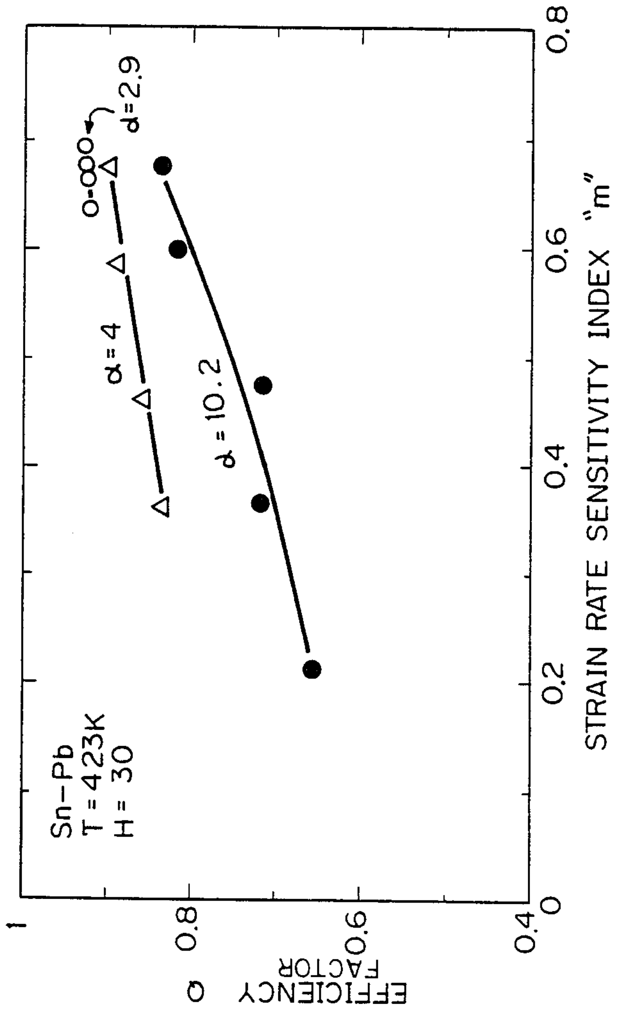
FIG. 5 is a graph similar to FIG. 4 at various $\alpha$.

In this case, "Q" equals "1" ($\alpha=1$). However, in the case of the Sn-38Pb (superplastic alloy) medium, another pressure transmission efficiency Q is obtained, which efficiency depends upon the velocity of the small piston, the strain rate sensitivity index (m), and the ratio of area, as shown in FIGS. 3, 4, and 5. The strain rate sensitivity index (m) is defined in relation to a certain strain rate. In FIGS. 3, 4 and 5, a strain rate of a portion of the sample adjoining the small piston 2 is considered as the strain rate of Sn-38pb sample. As the velocity (V) of the small piston decreases and as the strain rate sensitivity index (m) approaches its maximum value (about 0.68), the efficiency factor Q increases. A Q of 0.85 can be attained under the conditions: $\alpha=11.1$, $A_1=176.7$ mm², $A_2=1964$ mm², H=10 mm, T=423° K., $V=1.67\times10^{-6}$ m/s, and m=0.68, as shown in FIG. 3. It is possible to obtain a Q of 0.93 at $\alpha=2.9$ (FIG. 5). The apparatus can serve as a force multiplication apparatus.

It is possible to use superplastic alloys shown in Tables 1(a), 1(b) and 1(c) as the pressure transmitting medium.

TABLE 1

| No. | Composition of superplastic alloy | Temperature range for pressure transmission ability °C. | Maximum m | Maximum elongation % |
|---|---|---|---|---|
| | | (a) | | |
| 1 | Al—17% Cu | 350-548 | 0.7 | 600 |
| 2 | Al—37% Cu (eutectic) | " | 0.8 | 500 |
| 3 | Al—33% Cu7% Mg | 350-500 | 0.72 | >600 |
| 4 | Al—25% Cu—11% Mg | " | 0.69 | >600 |
| 5 | Al—5.6% Zn—1.56% Mg—0.41% Zr | 350-600 | 0.7 | 500 |
| 6 | Al—10.72% Zn—0.93% Mg—0.42% Zr | 350-600 | 0.9 | 1550 |
| 7 | Bi—34% In (eutectic) | 0-72 | 0.76 | 450 |
| 8 | Cd—27% Zn | 0-260 | 0.5 | 350 |
| 9 | Co—10% Al | 950-1300 | 0.47 | 850 |
| 10 | Cu—9.8% Al | 565-850 | 0.7 | 700 |
| 11 | Cu—2.8% Al—1.8% Si—0.4% Co | 350-577 | 0.46 | 318 |
| 12 | Cu—7% P | 350-710 | 0.5 | >600 |
| 13 | Cu—38.5% Zn—3% Fe | 454-900 | 0.53 | 330 |
| 14 | Cu—40% Zn | 454-850 | 0.64 | 515 |
| 15 | Cu—28% Ag (eutectic) | 500-779 | 0.53 | 500 |
| 16 | A.I.S.I. 1340 Steel | 720-910 | 0.65 | 380 |
| 17 | 0.18 C, 1.54 Mn, 0.01 Si, 0.9 P, 0.05 Al, 0.11 V | 720-910 | 0.55 | 320 |
| 18 | 0.18 C, 1.54 Mn, 0.011 Si, 1.98 P, 0.051 Al, 0.13 V | " | 0.55 | 376 |
| 19 | Fe—4% Ni | 900-1350 | 0.58 | 820 |
| 20 | 3% Mo, 1.6% Ti | 930-1300 | 0.67 | 615 |
| 21 | IN 744, Fe—6.5% Ni—26% Cr | 850-1350 | 0.5 | 600 |
| | | (b) | | |
| 22 | Mg ZK60 pellet | 200-450 | 0.45 | 1700 |
| | ingot | " | 0.4 | 1200 |
| 23 | Mg ZK60 | " | 0.4 | 1700 |
| 24 | Mg—Al (eutectic) | " | 0.85 | 2100 |
| 25 | Sn—5% Bi | 0-200 | 0.72 | ~1000 |
| 26 | Sn—1% Bi | " | 0.48 | 500 |
| 27 | " | " | 0.45 | 300 |
| 28 | Sn—2% Pb | 0-183 | 0.5 | 600 |
| 29 | Sn—38% Pb (eutectic) | 0-180 | 0.59 | 1080 |
| 30 | " | " | 0.5 | 1500 |
| 31 | " | " | 0.55 | 320 |
| 32 | " | " | 0.51 | 700 |
| 33 | " | " | 0.7 | >400 |
| 34 | Pb—Cd (eutectic) | 0-248 | 0.35 | 800 |
| 35 | Zn—22% Al (eutectoid) | 0-270 | 0.6 | 900 |
| 36 | " | " | 0.44 | 300 |

TABLE 1-continued

| No. | Composition of superplastic alloy | Temperature range for pressure transmission ability °C. | Maximum m | Maximum elongation % |
|---|---|---|---|---|
| 37 | " | " | 0.5 | >400 |
| 38 | " | " | 0.5 | >400 |
| 39 | " | " | 0.5 | 770 |
| 40 | " | " | 0.5 | 2500 |
| 41 | " | " | 0.5 | ~1000 |
| 42 | Zn—22% Al—4% Cu | " | 0.5 | ~1000 |
| 43 | Zn—22% Al—0.2% Mn | " | 0.5 | ~1000 |
| | (c) | | | |
| 44 | Zn—4.9 Al (eutectic) | " | 0.5 | 300 |
| 45 | Zn—40% Al | " | 0.48 | 700 |
| 46 | Zn—0.2% Al | " | 0.81 | 465 |
| 47 | Zn—0.1% Ni—0.04% Mg | " | 0.5 | >980 |
| 48 | Zn—0.4% Al | " | 0.43 | 550 |
| 49 | W—(15-30%)Re | 1600-2000 | 0.46 | 200 |

As shown in Tables 1a, 1b and 1c, the temperature range enabling the superplastic alloy to act as a pressure transmitting medium and the elongation are dependent on the composition of the alloy. It is preferable that the superplastic alloy have an elongation of more than 300%. The compression velocity (i.e, a velocity of piston transfer) is, usually, within the range of from 0.1 to 50 mm/min ($1.67\times10^{-6}$ to $8.33\times10^{-4}$ m/s). Furthermore, it is preferable that the strain rate sensitivity index "m" be more than 0.2, particularly, more than 0.3. As the "m" of a superplastic alloy approaches its maximum value and/or as the velocity of the small piston decreases, the alloy has a better ability of pressure transmission. When the superplastic alloy has its maximum "m", it is most suitable for the pressure transmitting medium. Therefore, according to the purpose of use and service conditions, the most suitable superplastic alloy should be selected.

In addition to the alloys shown in Tables 1a, 1b and 1c, it is possible to adopt the following alloys as the superplastic alloy: JIS-5083 Al alloy (temperature range for pressure transmission ability: 350°-510° C.), JIS-7075 Al alloy (450°-510° C.), JIS-7475 Al alloy (450°-510° C.), JIS-C6031 aluminum bronze (565°-850° C.), and CDA-619 aluminum bronze (565°-850° C.).

Referring to FIGS. *6a* and *6b*, a vertical type apparatus for transmitting pressure according to the present invention comprises a cylinder 12, a small piston 13, a large piston 14, and a superplastic alloy medium 11 consisting of a body part having a diameter D of 50 mm and a projecting portion having a diameter d of 30 mm, and a height h of 10 mm. The superplastic alloy medium 11 is made of Zn-22Al and is placed between the pistons 13 and 14 within the cylinder 12.

The Zn-22Al alloy medium was produced in the following manner:

Zn and Al were melted and cast into an ingot of eutectoid Zn-22Al having a diameter of 55 mm. The ingot was homogenized by annealing it at a temperature of 653° K. (380° C.) for 7 days. Then, the ingot was machined to form the medium 11 (FIG. *6a*) having the above-mentioned dimensions. The medium 11 was heated at a temperature of 653° K. (380° C.) and was water-quenched so as to refine the alloy structure.

Figure 7:
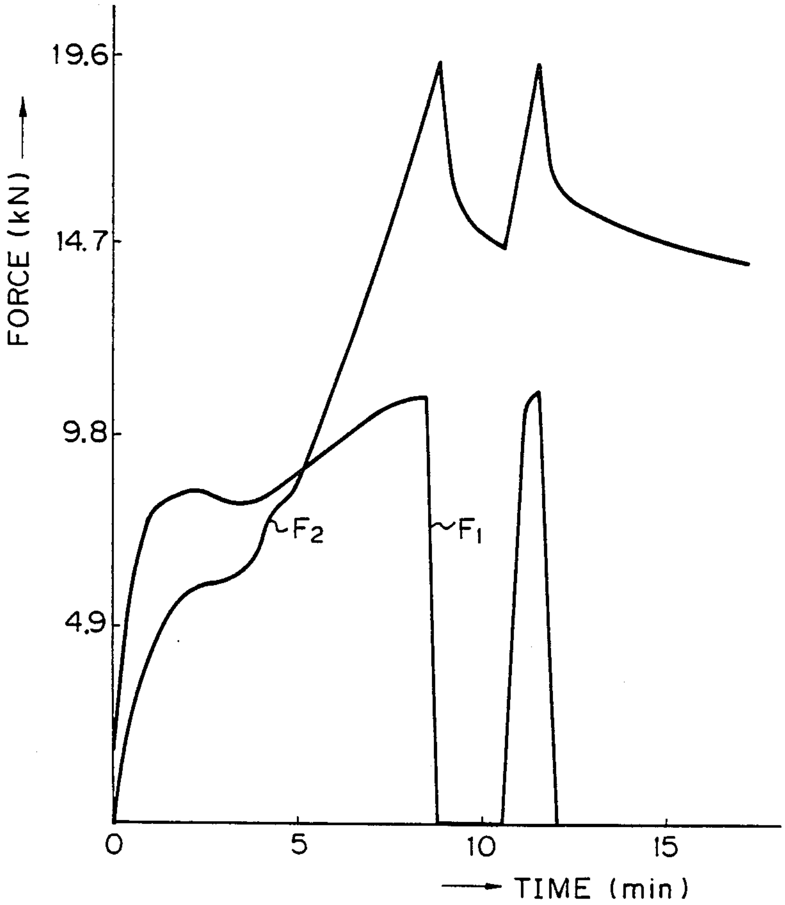
FIGS. 7 and 8 are graphs showing relationships between an applied force and an obtained force.

The obtained Zn-22Al medium was arranged in the apparatus as shown in FIG. *6b* and was tested by applying to it a force (load) $F_1$ through the small piston 13 to investigate a relationship between the applied force $F_1$ and the obtained force $F_2$ through the large piston 14. The testing temperature was 523° K. (250° C.) and the velocity of piston transfer was 1 mm/min ($16.7\times10^{-6}$ m/s). Varying the period of application of the force $F_1$, the results shown in FIGS. 7 and 8 were obtained.

In an initial stage, since the Zn-22Al superplastic alloy medium 11 should come into complete contact with the inside surfaces of the cylinder 12 and the faces of the pistons 13 and 14, the force $F_2$ is smaller than the force (load) $F_1$. After the complete contact, the force $F_1$ of the piston 13 is sufficiently transmitted to the piston 14 through the medium 11, and the force $F_2$, larger than the force $F_1$, is attained. Even when the force $F_1$ is changed to zero (namely, application of the force $F_1$ is stopped), the force $F_2$ does not become zero at once. The force $F_2$ decreases fast to a certain point and then decreases gradually. In the course of the decrease of the force $F_2$, if the force $F_1$ is reapplied on the piston 13, the force $F_2$ reincreases.

Figure 8:
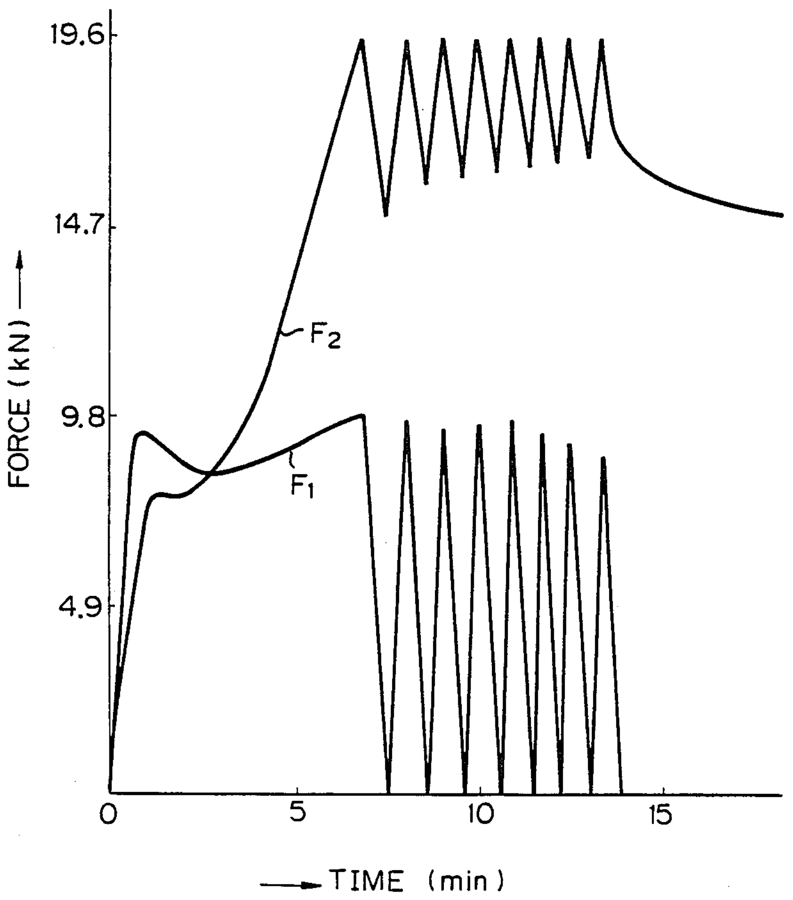

Furthermore, applications and release of the force $F_1$ are repeated alternately several times before the gradual decrease of the force $F_2$ appears, as shown in FIG. 8. It is apparent that the upper peaks and the lower peaks of the forces $F_1$ and $F_2$ appear almost simultaneously, respectively.

Therefore, the superplastic alloy has the ability to transmit pressure. The present invention utilizing the superplastic alloy as a pressure transmitting medium in an apparatus for transmitting pressure has the following advantages:

1. The apparatus can be used within a wide temperature range (from 0° C. to 2000° C.) by selecting a suitable superplastic alloy. In particular, the apparatus can be used at a high temperature of, e.g., more than 200° C.

2. The superplastic alloy medium does not leak, unlike a liquid or gas, so that the sealing structure can be simplified. The apparatus can be used under a high pressure condition.

3. The superplastic alloy medium is not compressed nor includes gas, unlike oil.

4. Even if part of the apparatus breaks, the superplastic alloy medium will not spout out.

5. With the apparatus for transmitting pressure, it is possible to increase or decrease the force, change the direction of application of the output force, and increase or decrease the stroke of the output piston and to combine the above in any manner.

6. The method and apparatus according to the present invention can be applied to an HIP apparatus, an extruder for metal, a sintering apparatus for ceramic powder and metal powder by a hot press method, and various apparatuses for transmitting pressure.

Figure 9:
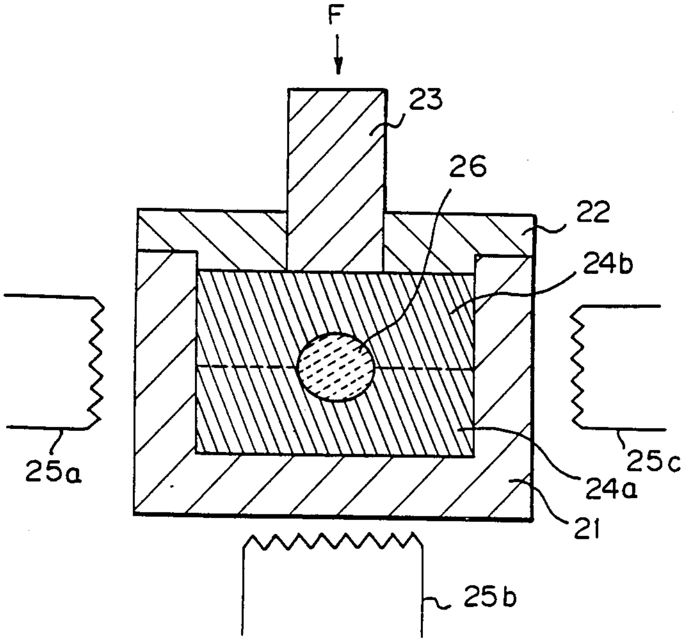
FIG. 9 is a schematic sectional view of a pressure transmitting apparatus for hot-press sintering according to the present invention.

Furthermore, referring to FIG. 9, a pressure transmitting apparatus for hot-press sintering comprises a container 21 with a lid 22, a piston 23, a superplastic alloy medium of two separate parts 24*a* and 24*b*, and heaters 25*a*, 25*b*, and 25*c*. A powder body 26 of metal powder, ceramic powder, or metal powder and fiber for fiber reinforced metal (FRM) is sandwiched with the separate parts 24*a* and 24*b* so as to arrange it within the superplastic alloy medium. Then the superplastic medium 24*a*, 24*b* is placed in the container 21 and the lid 22 is fixed on the container 21. The superplastic alloy medium containing the powder body 26 is heated by the heaters 25*a*–25*c* and is subjected to a force (load) F through the piston 23 actuated by, e.g., hydraulic power. While the sintering temperature for the powder body 26 is attained, the force F is applied so as to generate an isotactic compression pressure on the powder body. Thus the powder body is sintered under the pressure.

It will be obvious that the present invention is not restricted to the above-mentioned embodiments and that many variations are possible for persons skilled in the art without departing from the scope of the invention.

We claim:

1. In a method for increasing force by using two different size pistons and a pressure transmitting medium, wherein pressure is applied to the pressure transmitting medium substantially filling a pressure transmitting zone, and pressure is transmitted by the pressure transmitting medium throughout the pressure transmitting zone, the improvement which comprises: using a superplastic alloy as said pressure transmitting medium.

2. A method according to claim 1, wherein said superplastic alloy has a strain rate sensitivity index "m" of greater than 0.2.

3. A method according to claim 2, wherein said strain rate sensitivity index "m" is greater than 0.3.

4. A method according to claim 1, wherein said superplastic alloy medium is at a temperature of from 0° C. to 2000° C.

5. An apparatus for transmitting force comprising a first cylinder enclosing a first piston with an area normal to an axial force on said first piston, a second cylinder enclosing a second piston having an area normal to an axial force on said second piston different from the normal area of said first piston, and a pressure transmitting medium substantially filling a pressure transmitting zone in pressure communication with said first and second pistons, characterized in that said pressure transmitting medium is a superplastic alloy.

6. An apparatus according to claim 5, wherein said superplastic alloy has a strain rate sensitivity index "m" greater than 0.2.

7. An apparatus according to claim 6, wherein said strain rate sensitivity index "m" is greater than 0.3.

* * * * *